O. PIETTE.
SEMIDIRECT PROCESS OF TREATING COKE OVEN GAS.
APPLICATION FILED DEC. 4, 1918.
1,315,639.
Patented Sept. 9, 1919.
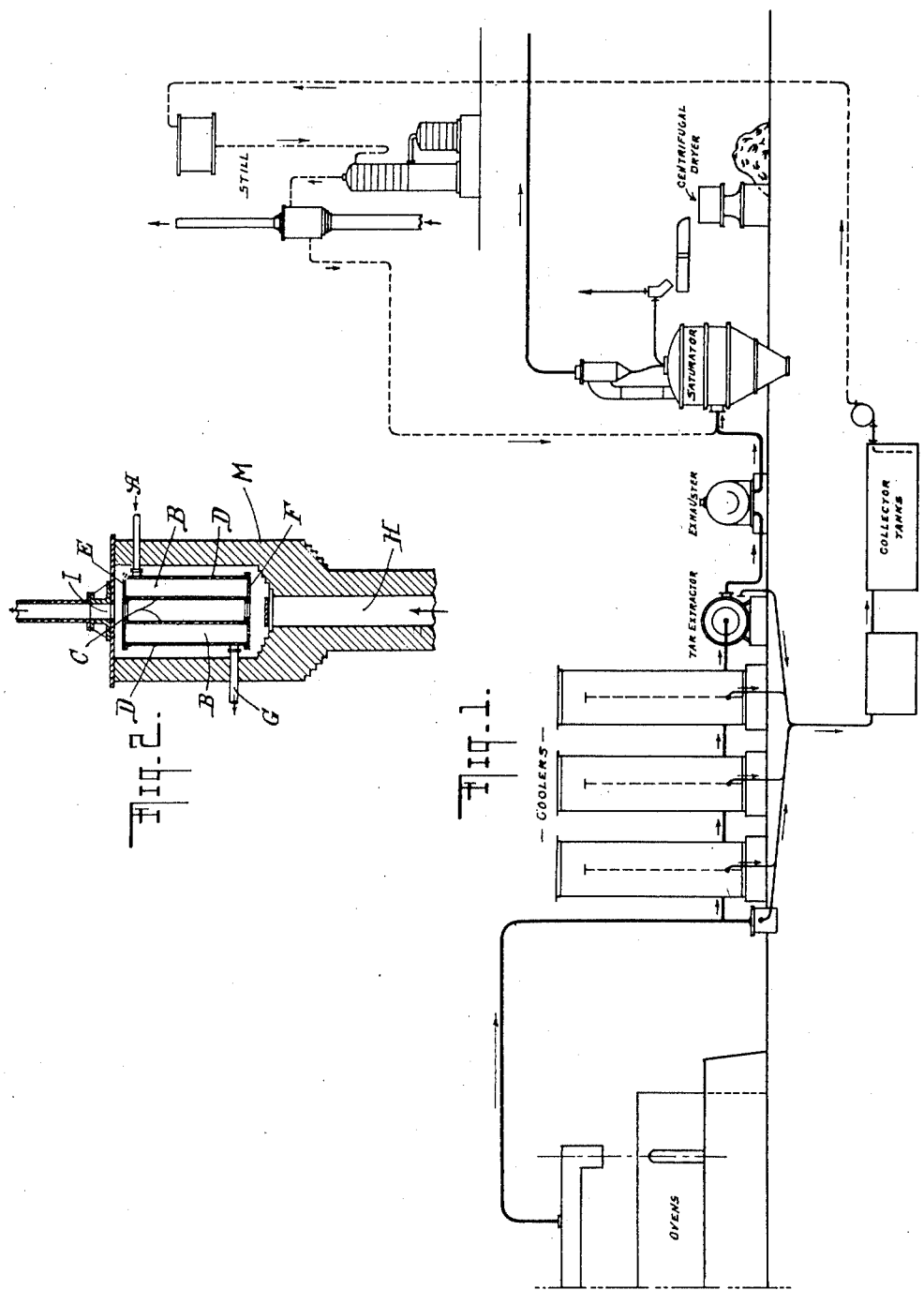
WITNESSES
INVENTOR
OLIVIER PIETTE
BY
ATTORNEYS

UNITED STATES PATENT OFFICE.

OLIVIER PIETTE, OF BRUSSELS, BELGIUM, ASSIGNOR TO SOCIÉTÉ FRANCO-BELGE DE FOURS À COKE, OF BRUSSELS, BELGIUM, A CORPORATION OF BELGIUM.

SEMIDIRECT PROCESS OF TREATING COKE-OVEN GAS.

1,315,639.   Specification of Letters Patent.   Patented Sept. 9, 1919.

Application filed December 4, 1918. Serial No. 265,200.

*To all whom it may concern:*

Be it known that I, OLIVIER PIETTE, a subject of the King of Belgium, and resident of Brussels, Belgium, temporarily of Paris, France, have invented certain new and useful Improvements in Semidirect Processes of Treating Coke-Oven Gas, of which the following is a specification.

The invention relates to the treatment of gases which are given off during the formation of coke, and has for its object an efficient and economical recovery of the ingredients of said gases. The invention comprises an improvement of what is known in the art as the semi-direct process, and is illustrated in the accompanying drawings, in which Figure 1 is a plan of a plant embodying my improvement and Fig. 2 is a vertical section of a detail thereof.

In the semi-direct processes of treating coke oven gases, the gases from the coke oven are passed in the usual manner through coolers in which the temperature of the gases is reduced to approximately the temperature of the air, thereby condensing the tar contents of the gases as well as part of the moisture. The residual tar is then extracted from the gases by a suitable extractor while the condensed moisture containing ammonia, generally as ammonium salts, is collected and distilled. The gases are forced from the tar extractor into the saturator by means of an exhauster. The saturator contains a warm, dilute sulfuric acid solution, the solution being continuously augmented by a fresh supply of sulfuric acid. The result of the passage of the gas through the sulfuric acid in the saturator is the formation of crystallized sulfate as the result of the reaction between the ammonia of the gas and the sulfuric acid. The crystallized sulfate is continuously and mechanically ejected from the saturator by means of an ejector of suitable form and construction and the crystals are subsequently dried and collected. Meanwhile, the condensed moisture containing ammonia accumulated in the collecting tanks, is distilled with lime according to well known processes. After the ammonia gases have passed through the still they are generally introduced into the saturator in order to permit the sulfuric acid, with the ammonia gas thus supplied, to cause the production of crystallized sulfate, as in the case of the gases coming directly to the saturator from the coolers and tar extractor.

When the ammonia gases from the still are thus introduced into the saturator, they contain a substantial quantity of steam or water vapor which, if allowed to condense in the saturator, will dilute the acid solution to such an extent as to prevent crystallization of the sulfate. Various remedies have been heretofore suggested to overcome this difficulty. One method has been to subject the ammonia gases from the still to refrigeration and thereby to eliminate the water contents thereof. Obviously in such case a part of the ammonia is absorbed in the condensate and this latter must again be subjected to distillation. The refrigerating processes are both expensive and inefficient. Again it has been proposed to heat the coke oven gases by steam before said gases are introduced into the saturator and mixed with the ammonia gases from the still. This requires a large amount of steam and is, consequently, expensive. Condensation in the saturator can also be avoided by a careful control of the strength of the acid and the proportion of cool ammonia gas supplied thereto, since the light compression of the exhauster and the combination of ammonia with sulfuric acid creates sufficient heat to prevent water condensation provided the cool ammonia is present in sufficiently large quantities and the acid is sufficiently concentrated. This latter procedure involves constant control over a number of varying conditions and, as a rule, results at one time or another in the acid solution becoming too dilute.

According to my invention, I proceed along different lines. Immediately after the ammonia gas leaves the still, I not only dispense with refrigeration or cooling thereof but, on the contrary, elevate the temperature of the same above that which it already possesses at this point. The heat required for this step is furnished by any convenient source, such as the waste gases from the coke oven operation or from the boilers, producer gas, steam, etc. By preference, however, the heat needed by my process is supplied by the burnt gases from the ovens or heat from the boilers or from a special hearth. The ammonia gas at the outlet of the still being already at a temperature of approximately 90°C, is not permitted to lose this temperature but is led directly through the heater, wherein its temperature is elevated, preferably to about 200° C. A suitable heating chamber M is illustrated in Fig. 2, in which the ammonia gas enters at A, and proceeds thence into the annular space B formed by the two concentric pipes C, D, the annular space between the tubular members C, D, being closed at the top and bottom, as indicated at E and F. The gas leaves the annular space B at G. The heating medium is introduced through the conduit H and flows upwardly around the tube D and through tube C and thence out of the chamber at I into the stack. The highly heated ammonia gas from my auxiliary heater is then mixed with the cooled gases from the coke oven just prior to their introduction into the saturator, and imparts such a temperature to the mixed gases as will be sufficient to prevent condensation in the saturator of the moisture contents of the mixed gases. The proportion of ammonia in the gas and the strength of the solution of sulfuric acid require no control during the process for the purpose of compensating for the reactions. The sulfuric acid may be of any desired degree of dilution and the quantity of ammonia in the gas may be whatever it is and the production of sulfate will proceed without interference on the part of moisture condensation in the saturator.

The heat present in the ammonia gas when it leaves the still is not only utilized, but the necessity of expensive refrigeration to destroy it is obviated. The addition of heat to the ammonia gas as it leaves the still prevents any condensation of moisture not only within the saturator but also before the gas reaches the saturator.

I claim:

1. In the art of recovering by-products from coke ovens by the semi-direct process, that improvement which consists in producing ammonia containing gases in a still, withdrawing the same at a temperature of approximately 90° C., then increasing the said temperature of the said gases, then causing said gases so heated to mix with the cooled gases from the coke oven and thereby to raise the temperature thereof and then introducing the combined gases into sulfuric acid.

2. In the art of recovering by-products from coke ovens by the semi-direct process, that improvement which consists in increasing the temperature of the ammonia containing gases as they leave the still to a temperature of approximately 200° C. by means of hot gases from the coke oven, causing the gases so heated to mix with the cooled gases from the coke oven and thereby to raise the temperature thereof and then introducing the combined gases into sulfuric acid.

In testimony whereof I have hereunto set my hand.

OLIVIER PIETTE.